United States Patent Office 2,717,886
Patented Sept. 13, 1955

2,717,886

POLYMERS OF N-ALKYL-N-VINYLBENZAMIDES

Richard R. Morner, Dayton, Ohio, and Raymond I. Longley, Jr., Springfield, Mass., assignors to Monsanto Chemical Company, St. Louis, Mo., a corporation of Delaware No Drawing. Application October 18, 1952, Serial No. 315,575

9 Claims. (Cl. 260—78.5)

The present invention relates to polymers of N-alkyl-N-vinylbenzamides.

According to our invention we prepare novel polymeric materials by the polymerization of N-alkyl-N-vinylbenzamides, either as homopolymers or as copolymers with a polymerizable unsaturated compound. The novel polymeric materials of this invention are useful as molding resins, coatings, fibers, films, etc.

The N-alkyl-N-vinylbenzamides may be prepared, for example, by the catalytic vinylation of N-alkylbenzamides. The N-alkylbenzamides may be readily prepared by acylation of a primary alkyl amine with a benzoyl chloride. Examples of suitable N-alkyl-N-vinylbenzamides for use according to the present invention are N-methyl-N-vinylbenzamide, N-ethyl-N-vinylbenzamide, N-i-propyl-N-vinylbenzamide, N-n-butyl-N-vinylbenzamide, N-sec-butyl-N-vinylbenzamide, N-trimethylpentyl-N-vinylbenzamide, etc. Those containing less than about 5 carbon atoms in the N-alkyl group are preferred.

Substitutions in the ring of the present benzamides will not adversely affect the properties of the polymeric materials; in some cases, where particular properties are required, these substituents will be highly desirable. Examples of such substituted benzamides are the N-alkyl-N-vinyl derivatives of alkylbenzamides such as methyl or dimethyl benzamides, mono- or polyhalobenzamides such as chloro- or fluorobenzamides, arylbenzamides such as phenylbenzamide, and others. Specific examples of such suitable monomers are N-i-propyl-N-vinyl-p-toluamide, N-methyl-N-vinyl-m-chlorobenzamide, N-ethyl-N-vinyl-p-fluorobenzamide, N-i-butyl-N-vinyl-m-phenylbenzamide, N-methyl-N-vinyl-p-(4-chlorophenyl)benzamide, and the like.

As stated above, the present N-alkyl-N-vinylbenzamide monomers may be homopolymerized or they may be copolymerized with other polymerizable unsaturated compounds, i. e., polymerizable vinyl-type compounds. Examples of suitable polymerizable unsaturated compounds are unsaturated hydrocarbons such as butadiene and styrene, vinyl halides such as vinyl chloride and vinylidene chloride, vinyl ethers such as divinyl ether, vinyl esters such as vinyl acetate, vinyl lactams such as N-vinyl-α-pyrrolidine, unsaturated acids or anhydrides such as methacrylic acid or maleic anhydride, unsaturated nitrogen-containing compounds such as acrylonitrile, methacrylamide, etc. The copolymers may also be prepared from mixtures of the present N-alkyl-N-vinylbenzamides having different alkyl groups on the nitrogen atom. An example of such a mixture is one which might be prepared from the acylation of a mixture of n-propyl and i-propyl primary amines.

While the present benzamide monomers can be interpolymerized with other copolymerizable unsaturated compounds in substantially any desired ratio, we have found that it is advantageous to polymerize a mixture consisting of from about 5 to about 75 per cent by weight of our new benzamide monomer and from about 25 to about 95 per cent by weight of other polymerizable compound. A smaller range which can be conveniently used is from about 10 to about 50 per cent by weight of the N-alkyl-N-vinylbenzamide and from about 50 to about 90 per cent by weight of the other polymerizable compound.

The polymerization may be carried out in emulsions or suspensions, in solutions with suitable solvents or diluents, or in a mass in the absence of diluents. The polymerization can be catalyzed with any suitable catalyst for polymerization of unsaturated compounds. Examples of such catalysts are benzoyl peroxide and azo-bisdiisobutyronitrile.

The following examples will serve to illustrate our invention.

EXAMPLE 1

*Preparation of N-methyl-N-vinylbenzamide*

Nitrogen was bubbled through 140 grams of molten N-methylbenzamide and about 1.5 grams of potassium was added in small pieces. A vigorous reaction resulted with considerable evolution of smoke and darkening of the reaction mixture. The mixture was charged to a 300-ml. autoclave and purged with nitrogen at 200 pounds per square inch. The nitrogen was then purged from the autoclave with acetylene at 200 pounds per square inch and then acetylene was slowly added to increase the pressure to 250 pounds per square inch while heating to 155° C. Heating was then discontinued, but the heat evolved from the reaction carried the temperature on up to 166° C. During this latter period the pressure was allowed to drop to 150 pounds per square inch. After repressuring to 250 pounds per square inch, the reaction was continued for about one and one-half hours at 160° C. The autoclave was then vented and opened, and the reaction mixture flash distilled to about 165° C. at 15 mm. to recover a crude product. Upon redistillation N-methyl-N-vinylbenzamide was recovered, a light orange colored material, B. P. 136–137/14 mm., $n_D^{25}=1.5674$.

EXAMPLE 2

*Homopolymer of N-methyl-N-vinylbenzamide*

Five grams of N-methyl-N-vinylbenzamide was emulsified in 50 grams of water with the aid of one-tenth gram of emulsifier (a sodium salt of the sulfate of an aliphatic alcohol). One-tenth gram of catalyst (α,α-azo-bis-diisobutyronitrile) was also added. The emulsion was placed in a bottle which was purged with dry nitrogen, capped, and tumbled in an air over at 60° C. for 24 hours. The reaction mixture was poured into alcohol and diluted with water, from which a solid polymer (softening point at 211° C.) was recovered by filtration and drying.

EXAMPLE 3

*Copolymer of N-methyl-N-vinylbenzamide with styrene*

Two and five-tenths grams of the N-alkyl-N-vinylbenzamide prepared as in Example 1 and 7.5 grams of styrene monomer were emulsified in 50 grams of water with one-tenth gram each of the same emulsifier and catalyst used in Example 2. After copolymerization under the same conditions as in Example 2, the reaction mixture was poured into alcohol, and the precipitated solid was recovered by filtration and dried. Upon analysis the copolymer was found to contain about 12.5 weight per cent of benzamide monomer units. The melting point of the copolymer was 197° C.

EXAMPLE 4

*Copolymer of acrylonitrile and N-methyl-N-vinylbenzamide*

The procedure of Example 3 was repeated except that acrylonitrile was substituted for the styrene monomer. The resulting copolymer contained about 23.5 per cent by weight of benzamide monomer units and had a softening point of 196° C.

EXAMPLE 5

*Copolymer of vinyl acetate and N-methyl-N-vinyl-benzamide*

The procedure of Example 3 was repeated except that vinyl acetate was substituted for the styrene monomer. The resultant copolymer, containing about 25 per cent by weight of benzamide monomer units, had a softening point below room temperature.

EXAMPLE 6

*Copolymer of methyl methacrylate and N-methyl-N-vinylbenzamide*

The procedure of Example 3 was repeated except that methyl methacrylate was used in place of styrene monomer. The resultant copolymer, containing about 16.3 per cent of benzamide monomer units, had a melting point of 263° C.

EXAMPLE 7

*Copolymer of vinyl chloride and N-methyl-N-vinyl-benzamide*

One and four-tenths grams of N-methyl-N-vinylbenzamide and 8.6 grams of vinyl chloride were emulsified in 50 grams of water. One-tenth gram each of the emulsifier and the catalyst used in the foregoing examples was also used in the present polymerization. The polymerization conditions were as described in the foregoing examples. The resulting copolymer contained about 8 per cent by weight of benzamide monomer units and had a softening point of about 142° C.

EXAMPLE 8

*Copolymer of maleic anhydride and N-methyl-N-vinylbenzamide*

Six and two-tenths grams of N-methyl-N-vinylbenzamide and 3.8 grams of maleic anhydride were dissolved in 50 grams of benzene, along with one gram of catalyst (α,α-azo-bis-diisobutyronitrile). After polymerization under conditions described in the preceding examples, a yellow solid was filtered from the reaction mixture, washed with benzene and dried. The copolymer contained about 61 per cent by weight of benzamide monomer units and had a melting point of about 222° C.

What we claim is:

1. A polymer of an N-alkyl-N-vinylbenzamide.
2. A polymer of N-methyl-N-vinylbenzamide.
3. A copolymer of N-alkyl-N-vinylbenzamide and a polymerizable ethylenically unsaturated compound other than said benzamide.
4. A copolymer obtained by copolymerizing between about 5 and about 75 per cent by weight of N-methyl-N-vinylbenzamide and between about 25 per cent and about 95 per cent by weight of a polymerizable ethylenically unsaturated compound other than the said benzamide.
5. A copolymer obtained by copolymerizing between about 5 and about 75 per cent by weight of N-alkyl-N-vinylbenzamide and between about 25 per cent and about 95 per cent by weight of styrene.
6. A copolymer obtained by copolymerizing between about 5 and about 75 per cent by weight of N-alkyl-N-vinylbenzamide nad between about 25 per cent and about 95 per cent by weight of acrylonitrile.
7. A copolymer obtained by copolymerizing between about 5 and about 75 per cent by weight of N-alkyl-N-vinylbenzamide and between about 25 per cent and about 95 per cent by weight of vinyl acetate.
8. A copolymer obtained by copolymerizing between about 5 and about 75 per cent by weight of N-alkyl-N-vinylbenzamide and between about 25 per cent and about 95 per cent by weight of vinyl chloride.
9. A copolymer obtained by copolymerizing between about 5 and about 75 percent by weight of N-alkyl-N-vinylbenzamide, and between about 25 percent and about 95 percent by weight of maleic anhydride.

References Cited in the file of this patent
UNITED STATES PATENTS

| Number | Name | Date |
|---|---|---|
| 2,231,905 | Hanford | Feb. 18, 1941 |
| 2,416,522 | Gertler et al. | Feb. 25, 1947 |
| 2,484,423 | Reynolds et al. | Oct. 11, 1949 |
| 2,551,891 | Martin | May 8, 1951 |
| 2,687,403 | Ballard et al. | Aug. 24, 1954 |